(12) United States Patent
Hennig (10) Patent No.: US 9,328,627 B2
(45) Date of Patent: May 3, 2016

(54) BEARING DEVICE AND TURBOMACHINE HAVING A BEARING DEVICE

(71) Applicant: Rolls-Royce Deutschland Ltd & Co KG, Blankenfelde-Mahlow (DE)

(72) Inventor: Sebastian Hennig, Braunschweig (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 734 days.

(21) Appl. No.: 13/680,887

(22) Filed: Nov. 19, 2012

(65) Prior Publication Data

US 2013/0129505 A1  May 23, 2013

(30) Foreign Application Priority Data

Nov. 18, 2011 (DE) .......................... 10 2011 086 674

(51) Int. Cl.
| | |
|---|---|
| *F16H 25/22* | (2006.01) |
| *F16C 19/54* | (2006.01) |
| *F01D 25/16* | (2006.01) |
| *F16H 25/20* | (2006.01) |
| *F16C 41/02* | (2006.01) |

(52) U.S. Cl.
CPC .............. *F01D 25/16* (2013.01); *F01D 25/162* (2013.01); *F16C 19/54* (2013.01); *F16C 41/02* (2013.01); *F16H 25/2025* (2013.01)

(58) Field of Classification Search
CPC .................. F01D 25/16; F01D 25/162; F16H 25/22–25/2295; F16H 2025/2445; Y10T 74/19744; Y10T 74/19781; Y10T 74/18672
See application file for complete search history.

(56) References Cited

U.S. PATENT DOCUMENTS

| | | | |
|---|---|---|---|
| 3,630,328 A * | 12/1971 | Nelson .......................... | 192/223 |
| 4,306,755 A | 12/1981 | Roberts | |
| 4,337,982 A | 7/1982 | Moringiello et al. | |
| 4,856,914 A | 8/1989 | Sigg | |
| 4,902,736 A | 2/1990 | Nanaka et al. | |
| 4,997,292 A | 3/1991 | Klimkovsky et al. | |
| 5,281,028 A | 1/1994 | Morita | |
| 6,685,382 B2 * | 2/2004 | Capewell et al. ............. | 403/343 |
| 7,249,534 B1 * | 7/2007 | Devenyi ..................... | 74/424.95 |
| 7,287,759 B2 * | 10/2007 | Uchiyama et al. ......... | 280/5.511 |

(Continued)

FOREIGN PATENT DOCUMENTS

| | | |
|---|---|---|
| DE | 3013034 | 10/1980 |
| DE | 3728828 | 8/1988 |

(Continued)

OTHER PUBLICATIONS

Bueth Verlag GmbH, "Kugelgewindegetriebe", DIN 69051, May 1989 with English translation attached.

(Continued)

*Primary Examiner* — Alan B Waits
(74) *Attorney, Agent, or Firm* — Timothy J. Klima; Shuttleworth & Ingersoll, PLC (57) ABSTRACT

A bearing device, for example in a turbomachine is provided. Between bearing races of the anti-friction bearings and a casing component positioned adjacent the bearing races is arranged a device for converting an axial force between the anti-friction bearings into a torque at the bearing races in the manner of a ball screw or planetary screw assembly. The bearing races are connected to one another by a feedback mechanism such that a torque at one bearing race can be converted into an opposite torque at the other bearing race.

24 Claims, 7 Drawing Sheets

(56) References Cited

U.S. PATENT DOCUMENTS

| | | | |
|---|---|---|---|
| 7,918,608 B2 | 4/2011 | Braun | |
| 8,100,646 B2 | 1/2012 | Venter | |
| 9,071,122 B2* | 6/2015 | Neufeld et al. | |
| 2004/0200929 A1* | 10/2004 | Perni et al. | 244/75 R |
| 2008/0232731 A1 | 9/2008 | Venter | |
| 2008/0289928 A1* | 11/2008 | Abraham et al. | 192/110 R |
| 2009/0095099 A1* | 4/2009 | Konomoto | 74/89.35 |
| 2009/0260468 A1* | 10/2009 | Tachikake | 74/424.82 |
| 2010/0142871 A1 | 6/2010 | Udall et al. | |
| 2012/0000446 A1* | 1/2012 | Venton-Walters et al. | 123/564 |
| 2013/0129505 A1* | 5/2013 | Heldner | 415/229 |
| 2013/0319147 A1* | 12/2013 | Yamada et al. | 74/89.23 |

FOREIGN PATENT DOCUMENTS

| | | |
|---|---|---|
| DE | 9214062 | 12/1992 |
| DE | 4227936 | 2/1993 |
| DE | 4337365 | 5/1994 |
| DE | 19938609 | 3/2001 |
| DE | 102010060326 | 6/2011 |
| EP | 0165699 | 12/1985 |
| EP | 0874137 | 10/1988 |
| EP | 1972804 | 9/2008 |
| EP | 1978267 | 10/2008 |
| EP | 2119877 | 11/2009 |
| GB | 19800 | 0/1915 |
| GB | 517418 | 1/1940 |
| GB | 650593 | 2/1951 |
| GB | 2394015 | 4/2004 |
| JP | 06074315 | 3/1994 |
| JP | 2004036747 | 2/2004 |
| JP | 2004076755 | 3/2004 |
| WO | 9410468 | 5/1994 |
| WO | 0111999 | 2/2001 |

OTHER PUBLICATIONS

Wikipedia German and English definition of Ball Screw, Jul. 25, 2011.
Wikipedia definition of Roller Screw, Jul. 26, 2011.
European Search Report from counterpart application.

* cited by examiner

BEARING DEVICE AND TURBOMACHINE HAVING A BEARING DEVICE

CROSS-REFERENCE TO RELATED APPLICATION

This application claims the benefit of German Patent Application No. 102011086674.4 filed on Nov. 18, 2011, the entirety of which is fully incorporated herein by reference.

BACKGROUND

This invention relates to a bearing device and to a turbomachine having a bearing device.

The design of a turbomachine, in particular of an aircraft, engine, is initially based on certain required performance characteristics. Only then are the loads applied on the bearing devices and other mechanical components determined. This can lead to an engine being optimized for a high performance for example, resulting in a very high thrust load that must be withstood by the bearing devices.

SUMMARY

The object is therefore to provide bearing devices that can cope flexibly and efficiently with very high requirements when axially and radially loaded.

A solution is provided by a bearing device.

The bearing device has two anti-friction bearings, where between bearing races of the anti-friction bearings and a component surrounding the bearing races is arranged a device for converting an axial force between the anti-friction bearings into a torque at the bearing races using a screw mechanism, such as a ball screw or planetary screw assembly, where the bearing races are connected to one another by a feedback mechanism such that a torque at one bearing race can be converted into an opposite torque at the other bearing race.

With a bearing device of this type, it is possible that differences occurring in the axial load distribution between the two anti-friction bearings of the bearing device automatically compensate for each other using the feedback mechanism. The device for converting the axial force into a torque (rotary movement) can here be arranged for example between an outer bearing race and a casing or an inner bearing race and a shaft. Generally speaking, a combination of these arrangements is also possible.

It is advantageous here when the device for converting an axial force into a torque in the manner of a ball screw or planetary screw assembly has first grooves with a type of thread pitch in the outer races and a second groove with a type of thread pitch in the casing, with compensating rolling elements being arranged in the grooves. It is possible with the grooves arranged with a pitch to convert the axial movement into a rotary movement.

An exemplary embodiment which is advantageous because of simple design is available when the feedback mechanism is designed as a compensating rocker, where a torque of the one outer race can be converted using the compensating rocker into a leverage and through the leverage an opposite torque can be initiated at the other outer race. The leverage thus transmits a kind of restoring torque from one outer race to the other. It is particularly advantageous here when the compensating rocker is designed as a beam-like element and connected to a counter bearing on the casing, where during operation the pivot point for the leverage effect of the compensating rocker is on the counter bearing. A compensating rocker of this type takes up only a little space and is easy to manufacture.

Generally speaking, the lever arms of the compensating rocker can be of identical length. If however it is intended to use the leverages with a greater flexibility, it is advantageous when the lever arms of the compensating rocker have different lengths.

Additionally or alternatively, an embodiment can advantageously have a feedback mechanism that has a deflecting device for balls of the device for converting an axial force between the anti-friction bearings into a torque at the bearing races, in the manner of a ball screw assembly.

In a further exemplary embodiment, inclined planes are arranged on the bearing races each opposite to one another, where the pitches of the inclined planes have different prefixes and a feedback mechanism, in particular a ball-like feedback mechanism, is operatively related to the inclined plane at the bearing race of one of the anti-friction bearings and to the opposite inclined plane at the bearing race of the other anti-friction bearing, such that a torque transmitted via the one inclined plane to the feedback mechanism is converted by the other inclined plane into an opposite torque. Due to the inclined planes, conversion can be achieved with a few moveable parts.

In a further advantageous exemplary embodiment, the feedback mechanism has a hydraulic mechanism capable of receiving a torque at one end, with the hydraulic mechanism, due to its shape, in particular a U-shape, being able to exert an opposite torque at the other end.

Advantageous embodiments of the bearing device have bearing races and casings where the pitch of the grooves in both anti-friction bearings is between 0.2 and 5°, in particular between 0.5 and 2°. For a greater flexibility in the conversion of the torques, it is expedient when the pitches of the grooves in the two anti-friction bearings differ.

In advantageous embodiments, the two anti-friction bearings can be of different design, in particular a radial bearing can be combined with an axial bearing.

Advantageous embodiments have spherical, barrelled, tapered or cylindrical rolling elements. It is possible in a bearing device to use different types of rolling elements in different anti-friction bearings.

Furthermore, in advantageous embodiments of the bearing devices at least one inner race is of split design.

Solution is provided by a turbomachine, in particular an aircraft engine. It is particularly advantageous here, when at least one bearing device in a three-shaft aircraft engine is arranged between a low-pressure shaft and an intermediate-pressure shaft or between an intermediate-pressure shaft and a high-pressure shaft, or in the case of a two-shaft aircraft engine between a low-pressure shaft and a high-pressure shaft.

BRIEF DESCRIPTION OF THE DRAWINGS

The invention is described in light of the figures showing exemplary embodiments.

DETAILED DESCRIPTION

Figure 1:
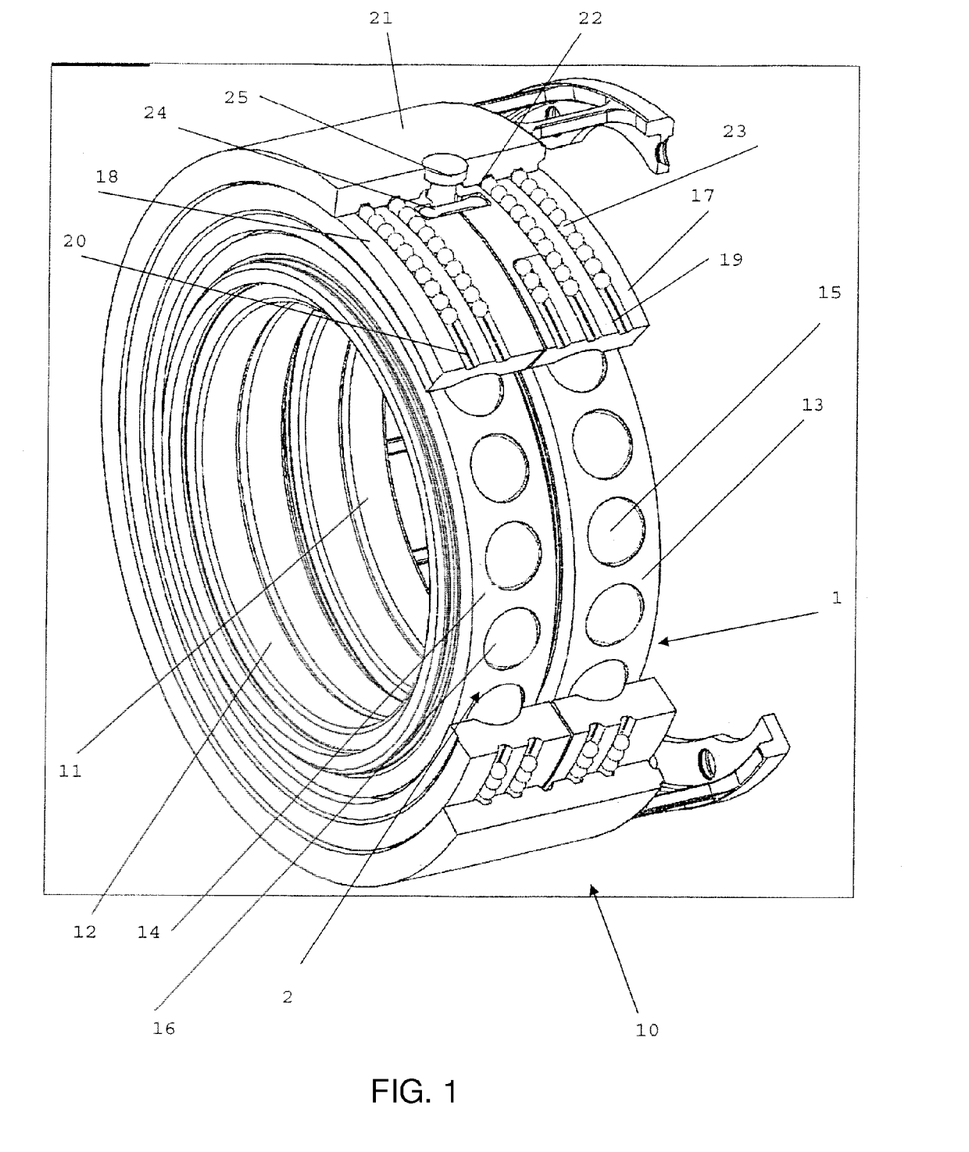
FIG. 1 shows the basic structure of an embodiment of a bearing device.
Figure 7:
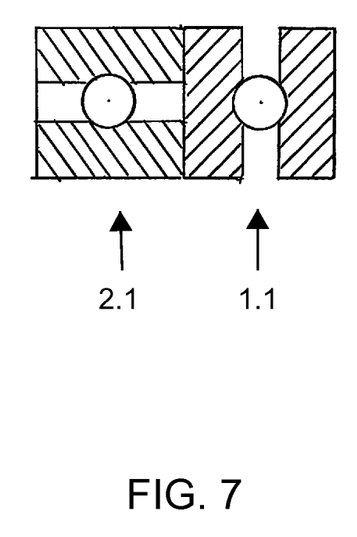
FIG. 7 shows a partial schematic sectional view of a two-row radial bearing having a pure axial bearing and a radial bearing.

FIG. 1 shows a perspective partial sectional view of a multi-row bearing device 10. The embodiment here shown is designed as a two-row radial bearing device 10, i.e. the bearing device 10 has a first anti-friction bearing 1 and a second anti-friction bearing 2. Generally speaking, it is also possible for the anti-friction bearings 1, 2 to be of different design, i.e. a pure axial bearing 1.1 is combined with a radial bearing 2.1 for transmitting radial and axial forces. See FIG. 7.

The respective inner races 11, 12 of the anti-friction bearings 1, 2 are split in a manner known per se. The use of split inner races is not essential, but they are frequently used in aircraft engines in particular. In this way, more rolling elements 15, 16 can be installed than in bearings with unsplit races. The split inner race 11, 12 is arranged on the inner diameter, since higher forces are effective between the balls and the outer bearing shell due to centrifugal forces. An unsplit outer race 17, 18 enables a better contact behaviour between ball and raceway to be achieved for keeping the surface pressures within limits. Rapidly rotating main bearings in engines therefore usually have a split inner race 11, 12 and a single-part outer race 17, 18 (so-called "three-point bearing"). Generally speaking, a single-part inner bearing shell can also be used.

Cages 13, 14 for the rolling elements 15, 16 are arranged around the inner races 11, 12 respectively. In the present embodiment, the rolling elements 15, 16 are designed as balls. Alternatively, tapered, cylindrical or barrelled elements can also be used as rolling elements 15, 16.

The rolling elements 15, 16 are each surrounded on the outside by the outer races 17, 18. Helical first grooves 19, 20 in the manner of a thread are arranged in the radially outward-facing surfaces of the outer races 17, 18 respectively. This means that the continuous helical first grooves 19, 20 have a certain angle (similar to the pitch of a thread) relative to the axial limiting surfaces of the anti-friction bearings 1, 2. The pitch of the first grooves 19, 20 is identical in both inner shells 17, 18 in this embodiment. In alternative embodiments, different pitches can also be used in the two outer races. It is thus possible to achieve, for example, different but defined load distributions, for example by different axial loading capacities of the anti-friction bearings 1, 2, thanks to different pitches.

Both outer races 17, 18 are radially closed off from the outside by a casing 21. This casing 21 has on its inside a continuous second groove 22, likewise in the shape of a thread, which is oriented to the first grooves 19, 20.

Compensating rolling elements 23, here of spherical shape, are moveably arranged in first grooves 19, 20 and in groove 22.

Due to the slanted arrangement of the grooves 19, 20, 22 and the compensating rolling elements 23 arranged therein, a type of ball screw assembly is created which is generally known from DIN 69051-1. Here the casing 21 assumes the function of the ball screw nut; the outer races 17, 18 assume the functions of the ball screw of the ball screw assembly.

Due to the slanted arrangement of the grooves 19, 20, 22 and the compensating rolling elements 23 running inside them—as in a ball screw assembly—it is possible to convert an axial movement into a rotary movement; an axial load is converted into a torque. A similar device to a ball screw assembly is a planetary screw assembly, where a linear movement can also be converted into a rotary movement.

In the case of a relative movement between the outer races 17, 18 and the casing 21, the compensating rolling elements 23 roll inside the grooves 19, 20, 22 (i.e. in the thread).

Due to the small angles of twist, a ball return as in a conventional ball screw assembly is not necessary. Standard ball screw assemblies are designed for long axial movement ranges. In the embodiments described here, however, only axial movements of less than one millimeter are needed.

In the embodiment shown, a coupling of the two anti-friction bearings 1, 2 by a feedback mechanism, here in the form of a compensating rocker 24, goes beyond the concept of the ball screw assembly.

The compensating rocker 24 provides a mechanical coupling of the two outer races 17, 18. To do so, the compensating rocker 24 contacts a counter bearing 25 arranged in the casing 21.

The compensating mechanism or feedback mechanism acts on the basis of two different effects. Using the pitch angle of the ball screw assembly, the bearing 1, 2 which has to withstand the higher axial load generates a greater rotational torque and thus leads to load balancing. Furthermore, the bearing 1, 2 which has to withstand the higher axial load also has a greater drag torque. This torque acts in the same direction as the axial load torque and assists load balancing.

With this feedback, an improvement of the load distribution is possible and is described in the following.

In known two-row bearing devices, even minor constructional divergences (for example in the micrometer range) and/or temperature gradients lead to an unequal distribution of the axial loads in the bearing device. If for example the inner race is 10° C. warmer than the outer race, this can for example lead to a mismatch of 5 μm, which in turns leads to unbalanced forces in the bearing device.

With the embodiment shown in FIG. 1, these unbalanced forces can be reduced or prevented regardless of the operating conditions. The bearing device 10 with the functionality of a ball screw assembly permits the conversion of a longitudinal movement to a rotary movement. As a result, axial forces to be transmitted are for example converted into a torque.

Since the pitch of the second grooves 19, 20, 21 in the two anti-friction bearings 1, 2 is identical, the axial forces occurring are converted into identical torques. However, the compensating rocker 24, designed similarly to the principle of a beam balance, permits small but always mutually opposing rotary movements of the two outer races 17, 18. The counter bearing 25 here has the function of the pivot point for the compensating rocker 24.

If one anti-friction bearing 1, 2 is subjected to a greater load than the other anti-friction bearing 2, 1, it acts on the compensating rocker 24 with a higher torque. The compensating rocker 24 yields and an opposing rotary movement of the outer races 17, 18 takes place. The anti-friction bearing 1, 2 subjected to the higher load disengages from the load application, while the anti-friction bearing 2, 1 with the lower load is more deeply engaged until a balance of forces prevails again. With this type of feedback, an unequal load distribution between the anti-friction bearings 1, 2 is prevented.

Figure 2:
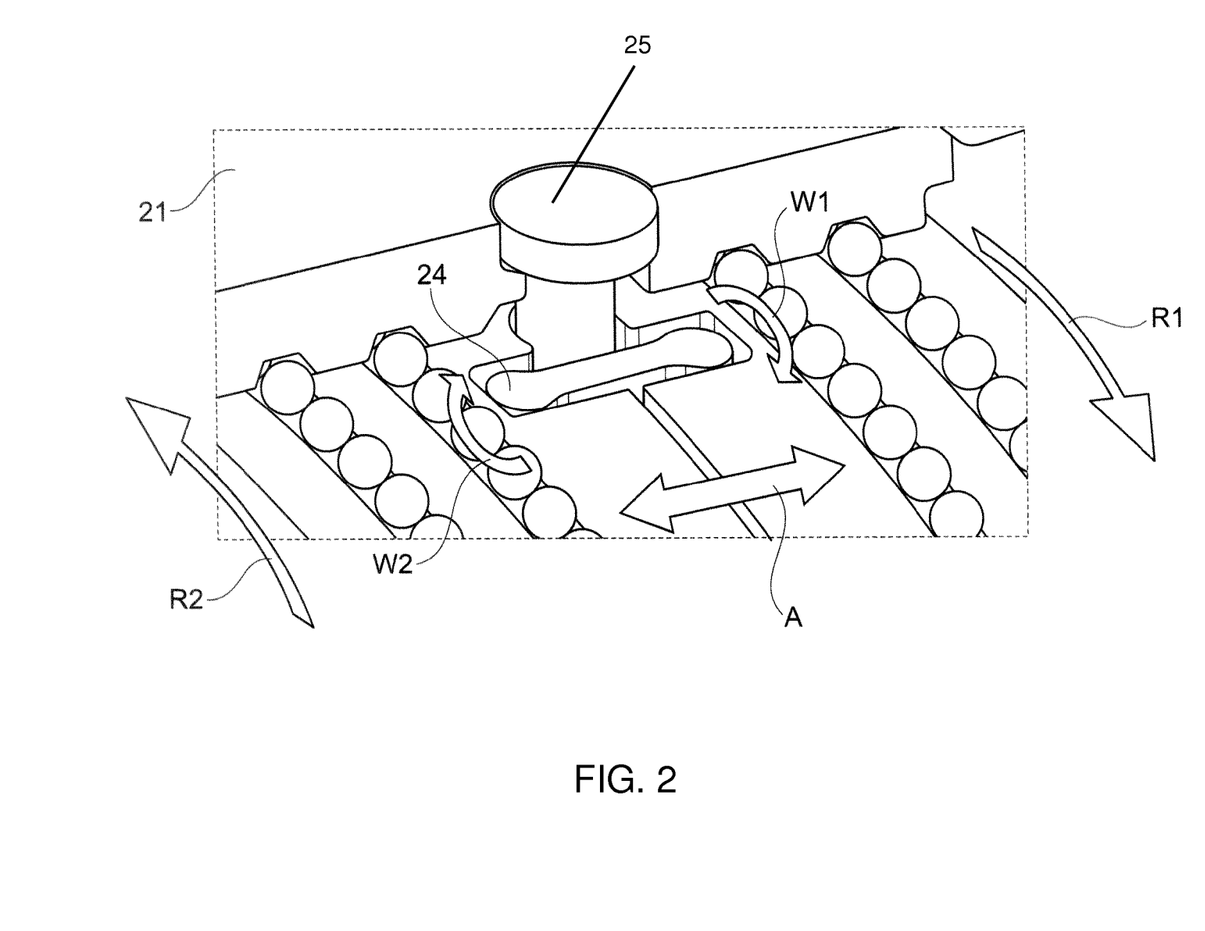
FIG. 2 shows a detail view of a compensating rocker in function.

For the following embodiments, reference is also made to FIG. 2, in which the torques and forces are represented.

If for example the second anti-friction bearing 2 is subjected to a higher load than the first anti-friction bearing 1 due to a temperature change, the second anti-friction bearing 2 transmits a higher axial load A. Hence the second anti-friction bearing 2 transmits a higher torque W2, W1 to the compensating rocker 24. The compensating rocker 24 tilts accordingly. The outer race 18 of the second anti-friction bearing 2 turns in the clockwise direction (i.e. in the arrow direction, see FIG. 1, R2 in FIG. 2). At the same time, the outer race 17 of the first anti-friction bearing 1 turns counter-clockwise (R1 in FIG. 2), such that the first anti-friction bearing 1 assumes a larger proportion of the total load until a balance of the forces is again achieved between the anti-friction bearings 1, 2.

In the embodiment shown, the pitch of the threads of grooves 19, 20, 22 is 1°. The compensating rocker 24 has a length of 18 mm.

An axial displaceability of +/−0.05 mm of the outer races 17, 18, i.e. a total displaceability of 0.1 mm, leads here to a tilting of the compensating rocker 24 by +/−100°. With an axial force of 40 kN per anti-friction bearing 1, 2, a force of 700 N acts on each end of the compensating rocker 24.

In the embodiment in accordance with FIGS. 1 and 2, the compensating rocker 24 is designed symmetrically to the counter bearing 25; the two lever arms of the compensating rocker 24 are of the same length. In alternative embodiments, a defined but unequal load distribution, for example due to different axial loading capacities of the anti-friction bearings 1, 2 can be achieved by an asymmetrical compensating rocker 24. One lever arm of the compensating rocker 24 would then be longer than the other. Due to different pitches of the grooves 19, 20, 22, multiplication or reduction of the torques is also possible.

In the embodiment in FIG. 1, the two outer races 17, 18 of the anti-friction bearings 1, 2 are designed directly adjacent to one another. This results in a compact installation space. In alternative embodiments, the outer races 17, 18 connected to the feedback mechanism 24 can also be spaced from one another.

Figure 3:
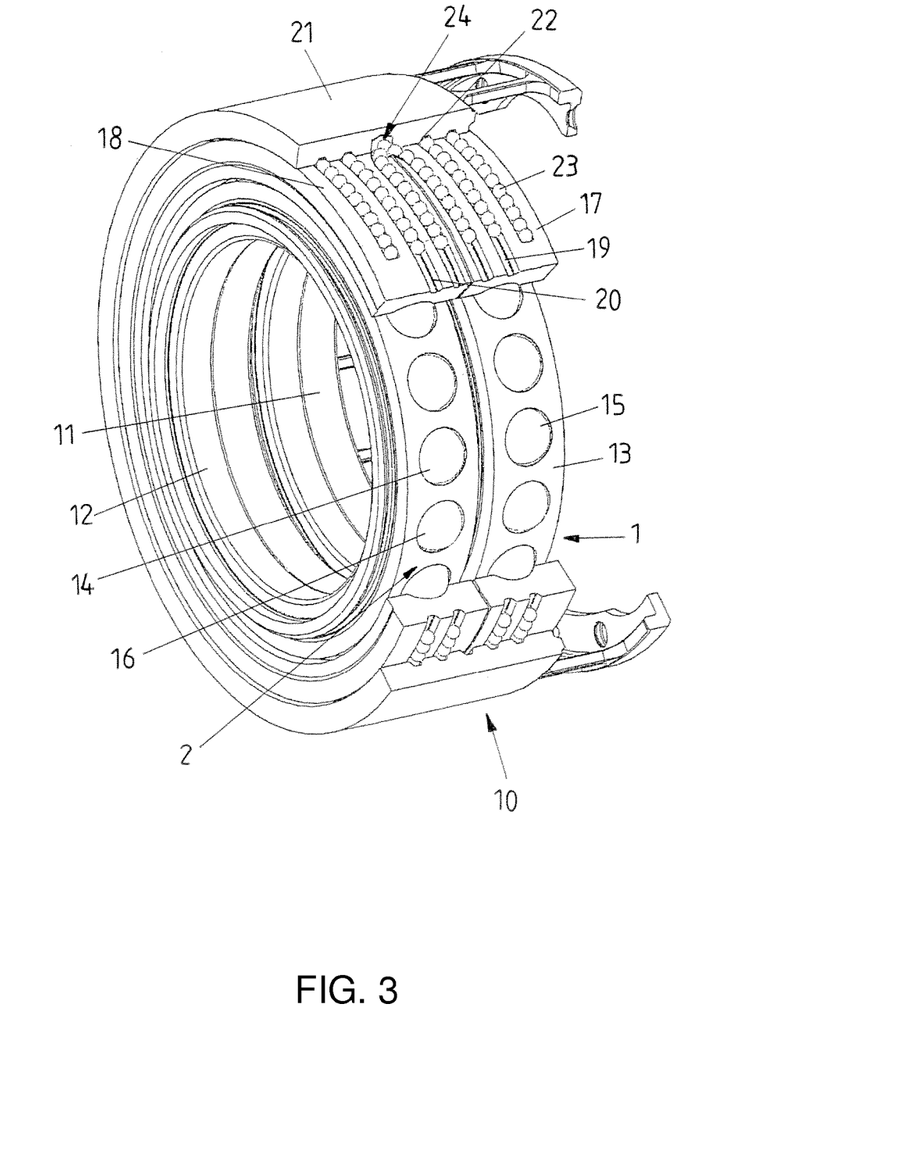
FIG. 3 shows a further embodiment with an alternative feedback mechanism.

FIG. 3 shows an alternative embodiment of a bearing device which is a variant of the embodiment shown in FIG. 1. Reference can be made to the description of FIG. 1.

However, the feedback of the force effect between the bearings 1, 2 is achieved not via a compensating rocker, but via a continuous ball race with a deflecting mechanism 24. Due to the different inclinations of the grooves in the first bearing 1 and in the second bearing 2, an opposing conversion of the axial force into a torque is achieved. As a result, resetting is achieved here too by way of feedback.

Figure 4:
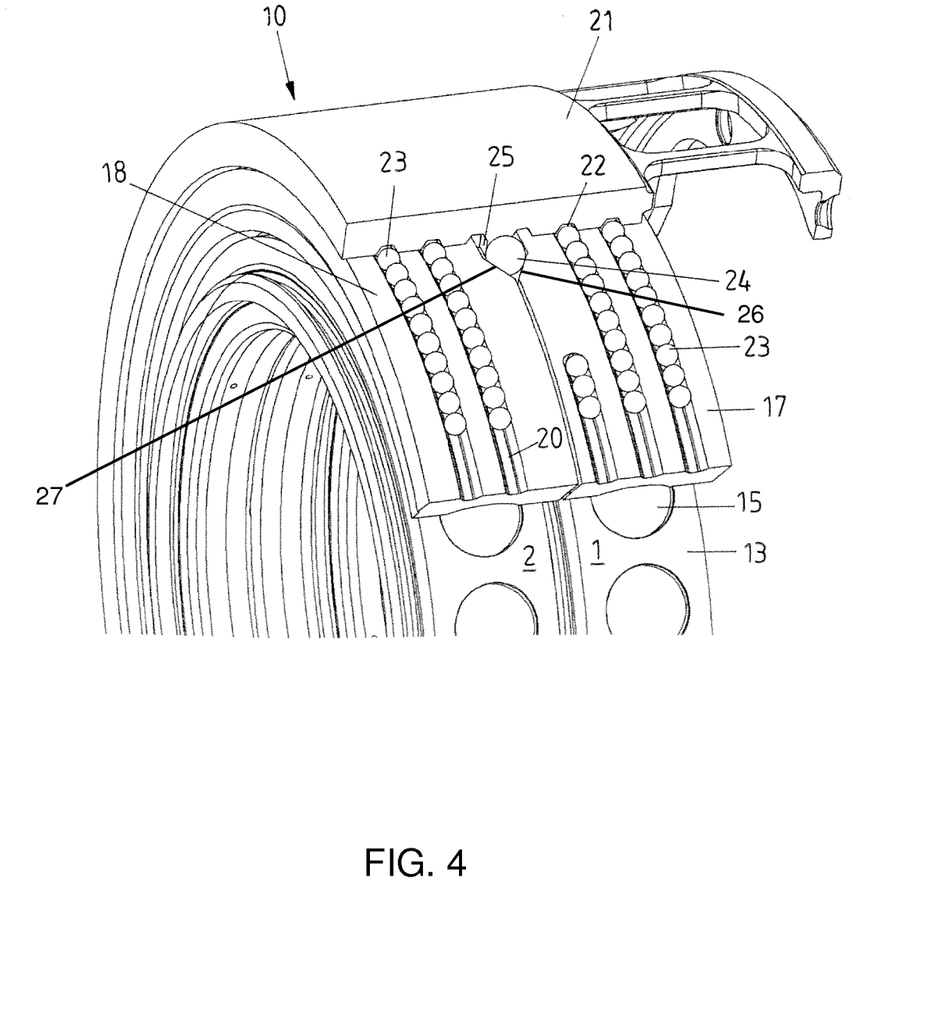
FIG. 4 shows a further embodiment with a feedback mechanism having an inclined plane.

FIG. 4 shows a further alternative embodiment of a bearing device which is a variant of the embodiment shown in FIG. 1. Reference can be made to the description in FIG. 1. The bearings 1, 2 are here connected to one another using a feedback mechanism 24 in the shape of a ball, where the ball 24 is operatively related to inclined planes 26, 27 and to the counter bearing 25.

The first inclined plane 26 is arranged on the outer race 17 of the first anti-friction bearing 1 and extends vertically to the outer race 17 of the first anti-friction bearing 1. The inclination of the first inclined plane 26 extends in the axial direction inwards from the outer rim of the outer race 17 of the first anti-friction bearing 1. The second inclined plane 27 is arranged mirror-inverted relative to it on the opposite side of the outer race 18 of the second anti-friction bearing 2. The pitches of the inclined planes 26, 27 have different prefixes, such that the inclined planes 26, 27 together form an angle in which the spherical feedback mechanism 24 is arranged.

An axial force between the anti-friction bearings 1, 2 is converted into a torque at the bearing races 17, 18, where the bearing races 17, 18 are connected to one another by the spherical feedback mechanism 24 such that a torque at one bearing race 17, 18 can be converted by the inclined planes having differently prefixed inclinations into an opposite torque at the other bearing race 18, 17. A torque in the outer bearing race 17 of the first bearing 1 is transmitted via the first inclined plane 26 to the spherical feedback element 24, which in turn rests on the counter bearing 25. This generates an opposite torque that is transmitted by the spherical feedback mechanism 24 via the second inclined plane 27 to the second bearing 2. This achieves a resetting in the manner already described above.

In the present case, the inclined planes 26, 27 are arranged symmetrically to a plane vertical to the bearing axis. This must not necessarily be the case. Other force and torque conditions can be created by different inclinations of the inclined planes 26, 27.

Figure 5:
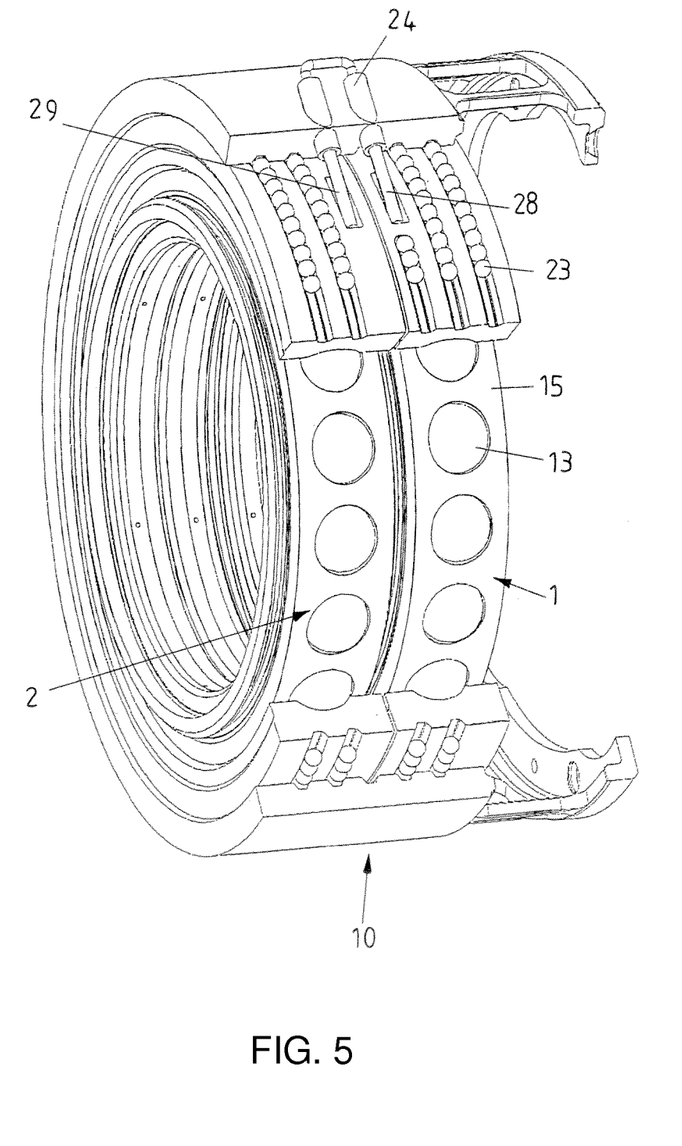
FIG. 5 shows a further embodiment with a feedback mechanism having a hydraulic compensation device.

FIG. 5 shows a further alternative embodiment of a bearing device which is a variant of the embodiment shown in FIG. 1. Reference can be made to the description of FIG. 1.

Here the feedback of the force effect between the bearings 1, 2 is not achieved using a compensating rocker, but using a substantially U-shaped hydraulic mechanism as the feedback mechanism 24. The torque in one bearing is transmitted via a first arm 28 of the hydraulic mechanism 25 to a second arm 29 of the hydraulic mechanism 24 parallel thereto. Due to the U-shaped design of the hydraulic mechanism, a reversal of the torques can be achieved.

The hydraulic mechanism can thus receive at one end a torque which, due to the shape of the hydraulic mechanism, in this case a U-shape, can exert an opposite torque at the other end.

The U-shape is an expedient design for the reversal of the torque. Generally speaking, however, other shapes are also conceivable for the hydraulic mechanism as a feedback mechanism 24.

Figure 6:
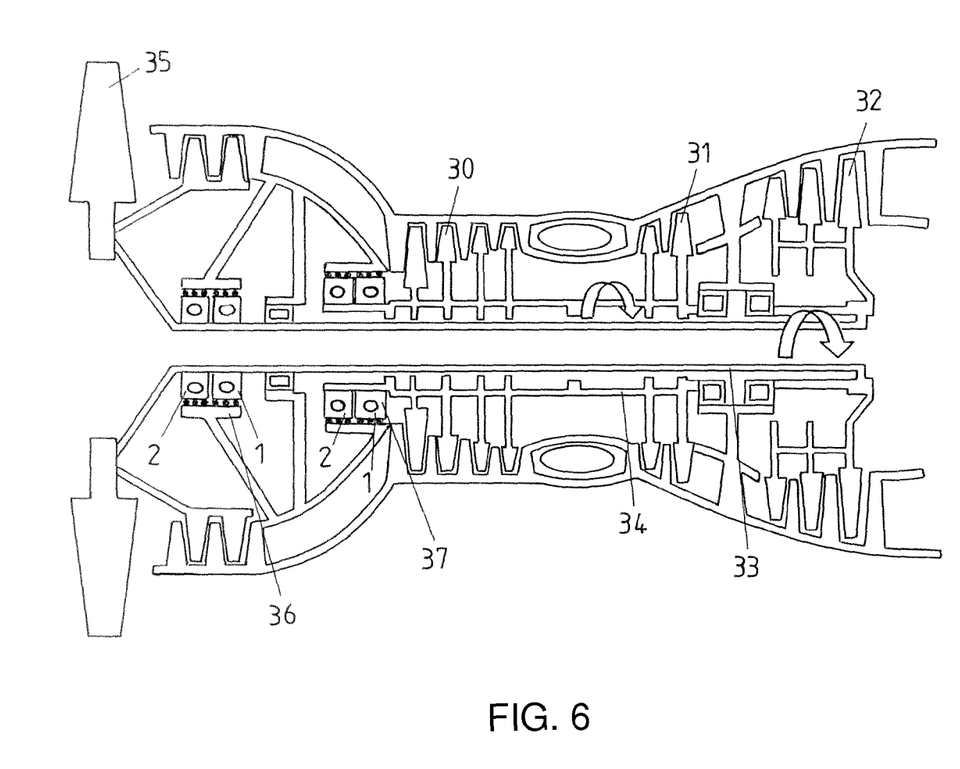
FIG. 6 shows an aircraft engine with embodiments of two bearing devices.

In FIG. 6 a sectional view of an aircraft engine known per se is represented. Here, the aircraft engine has two shafts 33, 34. A high-pressure compressor 30, a high-pressure turbine 31 and a low-pressure turbine 32 are arranged downstream of a fan 35 in flow direction.

Possible installation locations for embodiments of the bearing devices are for example the front bearing 36 of the low-pressure shaft 34 and/or the front bearing 37 of the high-pressure shaft 33. The details of the respective bearings are only shown schematically for reasons of clarity.

LIST OF REFERENCE NUMERALS

1 First anti-friction bearing
2 Second anti-friction bearing
10 Bearing device
11 First inner race (bearing race)
12 Second inner race (bearing race)
13 Cage for rolling elements of first anti-friction bearing
14 Cage for rolling elements of second anti-friction bearing
15 Rolling elements of first anti-friction bearing
16 Rolling elements of second anti-friction bearing
17 Outer race (bearing race) of first anti-friction bearing
18 Outer race (bearing race) of second anti-friction bearing
19 First groove in outer race of first anti-friction bearing
20 First groove in outer race of second anti-friction bearing
21 Casing
22 Second groove on inner side of casing
23 Compensating rolling elements
24 Compensating rocker, deflecting mechanism feedback mechanism)
25 Counter bearing
26 First inclined plane 27 Second inclined plane
28 First arm of a hydraulic mechanism
29 Second arm of a hydraulic mechanism
30 High-pressure compressor
31 High-pressure turbine
32 Low-pressure turbine
33 High-pressure shaft
34 Low-pressure shaft
35 Fan
36 Front bearing of the low-pressure shaft
37 Front bearing of the high-pressure shaft
A Axial force
R1 Torque of first anti-friction bearing
R2 Torque of second anti-friction bearing
W1 Tilting of compensating rocker
W2 Tilting of compensating rocker

The invention claimed is:

1. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:
a screw mechanism engaging between the casing component and the bearing races for converting an axial load on at least one of the bearing races into a rotary movement of the at least one of the bearing races;
a feedback mechanism connecting the bearing races to one another such that a torque at a first one of the bearing race can be converted into an opposite torque at a second one of the bearing races.

2. The bearing device in accordance with claim 1, wherein the screw mechanism includes a ball screw assembly having at least one first groove with a thread pitch in each of the first one and the second one of the bearing races and a second groove in the casing component, the second groove including a first portion with a thread pitch matched to the thread pitch of the first groove of the first one of the bearing races and a second portion with a thread pitch matched to the thread pitch of the first groove of the second one of the bearing races, with compensating rolling elements being arranged between the first and second grooves.

3. The bearing device in accordance with claim 1, wherein the feedback mechanism includes a compensating rocker, where a torque of one of the first one and the second one of the bearing races is converted using the compensating rocker into a leverage to apply an opposite torque at the other of the first one and the second one of the bearing races.

4. The bearing device in accordance with claim 3, wherein the compensating rocker includes a beam element which engages a counter bearing on the casing component acting as a pivot point for the leverage effect of the compensating rocker.

5. The bearing device in accordance with claim 4, wherein the compensating rocker includes lever arms of different lengths.

6. The bearing device in accordance with claim 1, wherein the screw mechanism includes rollers and the feedback mechanism includes a deflecting device for deflecting the rollers of the screw mechanism associated with one of the first one and the second one of the bearing races against rollers of the screw mechanism associated with the other of the first one and the second one of the bearing races.

7. The bearing device in accordance with claim 1, wherein the feedback mechanism further comprises:
a counter bearing connected to the casing component;
an inclined plane arranged on each of the first one and the second one of the bearing races opposing one another and facing toward the counter bearing; and
a roller positioned between the counter bearing and the inclined planes to be operatively related to the inclined plane at one of the first one and the second one of the bearing races and to the opposing inclined plane at the other one of the first one and the second one of the bearing races, such that a torque transmitted via one of the inclined planes is converted to an opposite torque at the other of the inclined planes.

8. The bearing device in accordance with claim 1, wherein the feedback mechanism further comprises a hydraulic mechanism for receiving a torque at one end and hydraulically converting the torque to an opposite torque at another end.

9. The bearing device in accordance with claim 8, wherein the hydraulic mechanism is U-shaped to convert the torque to the opposite torque.

10. The bearing device in accordance with claim 1, wherein the screw mechanism includes a groove in each of the first one and the second one of the bearing races and pitches of the grooves is from 0.2 to 5°.

11. The bearing device in accordance with claim 10, wherein the pitches of the grooves is from 0.5 to 2°.

12. The bearing device in accordance with claim 11, wherein the pitches of the grooves in each of the bearing races differ.

13. The bearing device in accordance with claim 1, wherein the converting device is coupled to an outer bearing race.

14. The bearing device in accordance with claim 1, wherein the two anti-friction bearings are of different configuration.

15. The bearing device in accordance with claim 1, wherein one of the two anti-friction bearings is a radial bearing and the other of the two anti-friction bearings is an axial bearing.

16. The bearing device in accordance with claim 1, wherein the screw mechanism includes rolling elements and the rolling elements are at least one chosen from spherical, barrelled, tapered and cylindrical.

17. The bearing device in accordance with claim 1, wherein at least one of the anti-friction bearings includes a split inner race.

18. A turbomachine, comprising at least one bearing device in accordance with claim 1.

19. The turbomachine in accordance with claim 18, wherein the turbo machine is an aircraft engine having at least one chosen from a three-shaft configuration and a two shaft configuration; wherein, where the aircraft engine is of the three-shaft configuration, the at least one bearing device is arranged at least one chosen from between a low-pressure shaft and an intermediate-pressure shaft, and between an intermediate-pressure shaft and a high-pressure shaft; wherein, where the aircraft engine is of the two-shaft configuration, the at least one bearing device is arranged between a low-pressure shaft and a high-pressure shaft.

20. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:

a screw mechanism engaging between the casing component and the bearing races;
a feedback mechanism connecting the bearing races to one another such that a torque at a first one of the bearing races can be converted into an opposite torque at a second one of the bearing races;
wherein the screw mechanism includes a ball screw assembly having at least one first groove with a thread pitch in each of the first one and the second one of the bearing races and a second groove in the casing component, the second groove including a first portion with a thread pitch matched to the thread pitch of the first groove of the first one of the bearing races and a second portion with a thread pitch matched to the thread pitch of the first groove of the second one of the bearing races, with compensating rolling elements being arranged between the first and second grooves.

21. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:
a screw mechanism engaging between the casing component and the bearing races;
a feedback mechanism connecting the bearing races to one another such that a torque at a first one of the bearing races can be converted into an opposite torque at a second one of the bearing races;
wherein the feedback mechanism includes a compensating rocker, where a torque of one of the first one and the second one of the bearing races is converted using the compensating rocker into a leverage to apply an opposite torque at the other of the first one and the second one of the bearing races.

22. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:
a screw mechanism engaging between the casing component and the bearing races;
a feedback mechanism connecting the bearing races to one another such that a torque at a first one of the bearing races can be converted into an opposite torque at a second one of the bearing races;
wherein the screw mechanism includes rollers and the feedback mechanism includes a deflecting device for deflecting the rollers of the screw mechanism associated with one of the first one and the second one of the bearing races against rollers of the screw mechanism associated with the other of the first one and the second one of the bearing races.

23. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:
a screw mechanism engaging between the casing component and the bearing races;
a feedback mechanism connecting the bearing races to one another such that a torque at a first one of the bearing races can be converted into an opposite torque at a second one of the bearing races;
wherein the feedback mechanism further comprises:
a counter bearing connected to the casing component;
an inclined plane arranged on each of the first one and the second one of the bearing races opposing one another and facing toward the counter bearing; and
a roller positioned between the counter bearing and the inclined planes to be operatively related to the inclined plane at one of the first one and the second one of the bearing races and to the opposing inclined plane at the other one of the first one and the second one of the bearing races, such that a torque transmitted via one of the inclined planes is converted to an opposite torque at the other of the inclined planes.

24. A bearing device, comprising:
a two-row arrangement of anti-friction bearings, each having a bearing race,
a casing component positioned adjacent the bearing races;
a converting device for converting an axial force between the anti-friction bearings into a torque at the bearing races, the converting device operatively positioned between the bearing races and the casing component and including:
a screw mechanism engaging between the casing component and the bearing races;
a feedback mechanism connecting the bearing races to one another such that a torque at a first one of the bearing races can be converted into an opposite torque at a second one of the bearing races;
wherein the feedback mechanism further comprises a hydraulic mechanism for receiving a torque at one end and hydraulically converting the torque to an opposite torque at another end.

* * * * *